(12) United States Patent
Shinohara et al.

(10) Patent No.: US 7,228,152 B1
(45) Date of Patent: Jun. 5, 2007

(54) MEMORY SYSTEM FOR PORTABLE TELEPHONE

(75) Inventors: Takayuki Shinohara, Hyogo (JP); Masatoshi Kimura, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 09/514,369

(22) Filed: Feb. 28, 2000

(30) Foreign Application Priority Data

Jul. 9, 1999 (JP) ............................ 11-195797

(51) Int. Cl.
   *H04B 1/38* (2006.01)
(52) U.S. Cl. .............. 455/557; 455/550.1; 365/185.09; 365/185.04; 714/5
(58) Field of Classification Search ................ 711/105; 710/8, 10, 11, 29; 365/226, 185.11, 185.33; 455/550, 557, 558, 575
See application file for complete search history.

(56) References Cited

U.S. PATENT DOCUMENTS

| | | | | |
|---|---|---|---|---|
| 5,367,571 | A | * | 11/1994 | Bowen et al. ............... 380/242 |
| 5,444,664 | A | * | 8/1995 | Kuroda et al. ......... 365/185.11 |
| 5,877,975 | A | * | 3/1999 | Jigour et al. ................ 365/244 |
| 6,026,016 | A | * | 2/2000 | Gafken ................... 365/185.04 |
| 6,034,891 | A | * | 3/2000 | Norman .................. 365/185.09 |
| 6,154,788 | A | * | 11/2000 | Robinson et al. ............. 710/10 |
| 6,189,056 | B1 | * | 2/2001 | Ogura et al. .................... 710/62 |
| 6,260,102 | B1 | * | 7/2001 | Robinson ...................... 710/10 |
| 6,279,069 | B1 | * | 8/2001 | Robinson et al. ............. 710/10 |
| 6,407,949 | B1 | * | 6/2002 | Jha et al. ..................... 365/218 |
| 6,460,145 | B1 | * | 10/2002 | Sassa et al. ..................... 714/5 |
| 2005/0159179 | A1 | * | 7/2005 | Sainton et al. ........... 455/552.1 |

FOREIGN PATENT DOCUMENTS

| | | |
|---|---|---|
| AU | 16123/95 | 10/1995 |
| DE | 197 41 703 | 4/1999 |
| EP | 0 498 454 | 8/1992 |
| EP | 0 675 661 | 10/1995 |
| EP | 0 792 077 | 8/1997 |
| EP | 0 833 251 | 4/1998 |
| EP | 1 046 980 | 10/2000 |

(Continued)

OTHER PUBLICATIONS

"Brown et al: 'Simultaneous code execution and data storage in a single flash memory chip for real time wireless communication systems" Circuits and Systems, 1997. Proceedings or the 40th Midwest Symposium on Sacramento, CA, USA, Aug. 3-6, 1997, New Year, IEEE, Aug. 3, 1997, pp. 740-745, IP010272311 ISBN: 0-7803-3694-1 *the whole document*.

*Primary Examiner*—Temica Beamer
*Assistant Examiner*—Joy Contee
(74) *Attorney, Agent, or Firm*—McDermott Will & Emery LLP

(57) ABSTRACT

A memory system is constituted of a file storage flash memory storing a control program required for a control portion and a large amount of data, and a random access memory storing a program used by the control portion and functioning as a buffer memory for received data. Thus, a memory system for a portable telephone capable of storing a large amount of received data at high-speed and allowing reading of the stored data at high-speed is provided.

19 Claims, 11 Drawing Sheets

FOREIGN PATENT DOCUMENTS

| | | |
|---|---|---|
| GB | 2 298 109 | 8/1996 |
| JP | 8-125742 | 5/1996 |
| JP | 97-29865 | 6/1997 |
| KR | 97-29865 | 6/1997 |
| KR | 99-24210 | 3/1999 |
| WO | WO 95/04991 | 2/1995 |
| WO | WO 98/29816 | 7/1998 |
| WO | WO 00/46668 | 8/2000 |

* cited by examiner

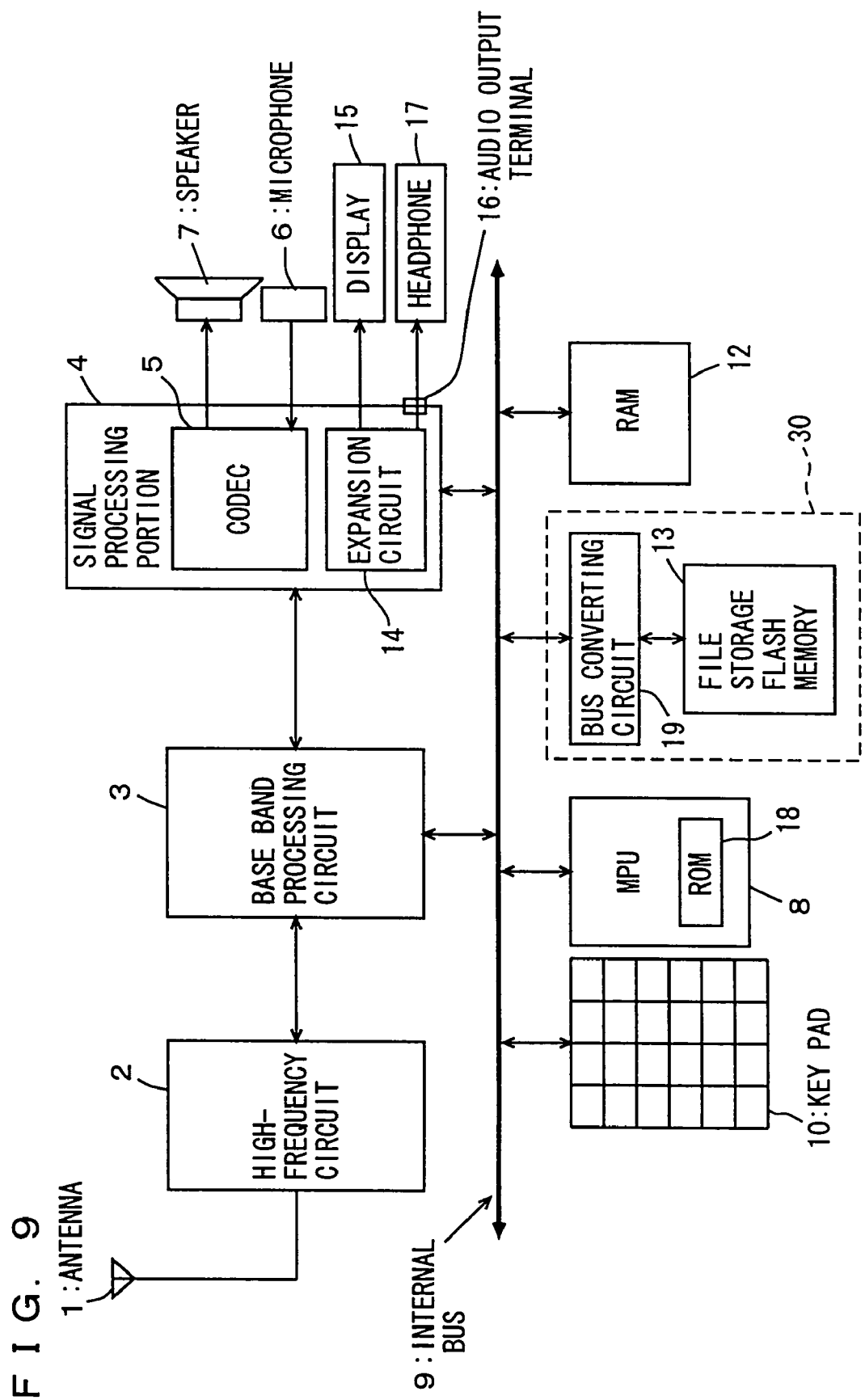

MEMORY SYSTEM FOR PORTABLE TELEPHONE

BACKGROUND OF THE INVENTION

1. Field of the Invention

The present invention relates to a memory system for a portable telephone and more particularly to a memory system for a portable telephone allowing storage of a large amount of data signals.

2. Description of the Background Art

FIG. 15 represents a schematic structure of a conventional portable telephone. In FIG. 15, the conventional portable telephone includes a high-frequency (radio-frequency) circuit 2 for transmitting/receiving a high-frequency signal via an antenna 1, a base band processing circuit 3 coupled to high-frequency circuit 2 and performing a process such as modulation at a basic frequency, a signal processing portion 4 coupled to base band processing circuit 3 and having a CODEC (coder/decoder) circuit 5 performing a processing of an audio signal such as encoding/decoding of a transmission/reception signal, a speaker 7 outputting a reproduced audio signal from signal processing portion 4, and a microphone 6 for inputting an audio signal to be transmitted to signal processing portion 4.

High-frequency circuit 2 including an amplifier circuit amplifies a signal supplied from base band processing circuit 3 for transmission via antenna 1 upon transmission, and extracts a signal of a certain frequency range from a high-frequency signal supplied via antenna 1 upon reception.

Base band processing circuit 3 performs a process such as modulation at a basic frequency on an encoded transmission signal supplied from signal processing portion 4 and decodes (expands) a signal in a basic frequency range from a high-frequency signal supplied from high-frequency circuit 2.

Signal processing portion 4 includes encoding/decoding circuit (CODEC) 5 encoding/decoding a speech signal, and encodes an audio signal input from microphone 6 at the time of transmission, and decodes an audio signal supplied from base band processing circuit 3 for outputting via speaker 7 at the time of reception.

The conventional portable telephone further includes a key pad 10 coupled to an internal bus 9 for an input of necessary information, a control portion (MPU: microprocessor unit) 8 coupled to internal bus 9 for controlling operations of base band processing circuit 3, signal processing portion 4 and key pad 10, a linear flash memory 11 utilized as a read-only memory storing a program for controlling an operation of control portion 8, and a random access memory (RAM) 12 used as a working area for various processing by control portion 8.

Key pad 10 includes a ten-key and an on-hook key and is used for the input of necessary information.

Linear flash memory 11 is a non-volatile memory allowing random access. Now, the operation of the portable telephone shown in FIG. 15 will be described, with emphasis on a memory system related to the present invention.

A memory of the storage capacity of 8 to 32M bits (megabits) is used as linear flash memory 11 for storing user-specific data (such as a telephone directory) of a user of the portable telephone, accounting/connecting information or audio data (time-shift/message recording function) as well as an instruction code for control portion 8.

When the telephone enters a communication mode for performing transmission/reception through the manipulation of key pad 10, control portion 8 performs a control operation according to a program stored in linear flash memory 11, and then, signal processing portion 4 and base band processing circuit 3 each perform a predetermined processing operation under the control of control portion 8, and the transmission/reception of an audio signal (speech sound communication) is performed.

In operation, control portion 8 performs various processes according to the instruction codes stored in linear flash memory 11. Linear flash memory 11 can be accessed in a random manner and relatively fast. With instruction codes (process program) required by control portion 8 stored in linear flash memory 11, control portion 8 can perform a designated process at high-speed. In addition, linear flash memory 11 is a non-volatile memory and capable of storing a program required by control portion 8, user-specific rewritable information and so on as a read-only memory (ROM).

Random access memory (RAM) 12 is a high-speed memory and performs high-speed data transmission and temporary data saving in conjunction with control portion 8 upon processing by control portion 8.

Linear flash memory 11 is operable with a single power supply voltage and a low power supply voltage and can be accessed in a random manner. The memory cell structures of linear flash memories include an NOR type cell and DINOR (divided bit line NOR) type cell.

FIG. 16 represents a schematic structure of an array portion of the linear flash memory. In FIG. 16, an array structure of the NOR type flash memory is shown as a representative example of the linear flash memory. In FIG. 16, memory cells MCs are arranged in a matrix. A word line WL (WL0–WLm) is arranged corresponding to each row of memory cells MCs. A bit line BL is arranged corresponding to each column of memory cells MCs. In FIG. 16, a bit line BL provided for memory cells MCs arranged in a column is shown representatively. Memory cell MC has a drain connected to bit line BL via a contact and a source connected to a source line SL.

Generally, in a flash memory, memory cell MC is constituted of one MOS transistor with a double gate structure having a control gate and a floating gate. As one memory cell MC is constituted of one transistor, cost per bit is low and high density integration is allowed. The NOR type flash memory shown in FIG. 16, however, has a structure where bit line BL formed of metal interconnection line is connected directly to the drain of the memory cell transistor via a contact, and one contact hole is required for each two memory cells for a connection of the memory cells and the bit lines, thus impeding the higher integration.

In a programming operation of the NOR type flash memory, a high voltage (about 10 volts) is applied to a word line (control gate) WL, source line SL is set to a ground voltage, a voltage of a few volt is applied to bit line BL, and a current flows through a channel region of the memory cell transistor. The channel current is accelerated by a high field at a drain and hot electrons are produced to be injected into a floating gate. By the electron injection into the floating gate, a threshold voltage of the memory cell transistor rises and the programming is effectuated. As the programming is performed by the injection of hot electron, supply of a current to the memory cell is required at the time of programming. In view of the saving of current consumption, programming is usually performed a byte at a time.

On the other hand, in the erasing operation, 0 V is applied to a word line (control gate) and about 10 V is applied to source line SL for cells in a block of a few K to 64 K byte. Bit line BL is set to an electrically floating state. In this state, a tunneling current flows from the floating gate to the source due to the Fowler-Nordheim tunneling phenomenon. Then, the electrons are pulled out from the floating gate and the threshold voltage of the memory cell transistor falls.

In the NOR type flash memory, though the programming can be achieved a byte at a time as described above, the erasing operation is performed on a unit of a block having a commonly provided source line SL, for example, a block with 64 K byte storage capacity. Thus, when certain written data is to be rewritten, the erasing must be performed on a block including the data. Therefore, valid data stored in the block including data to be erased must temporarily be saved in random access memory (RAM) 12. The block containing data to be saved has, for example, a storage capacity of 64 K byte, and a storage capacity of a memory used for temporary data saving must be large enough to allow its rewriting. In addition, temporary saving of valid data in this portion requires a management of a valid data region, thereby increasing the complexity of memory management.

Further, the linear flash memory has a longer access time compared with the operating speed of control portion 8. The access time of the linear flash memory is, for example, 70 ns (nanosecond) to about 120 ns. When control portion 8 operates in a high-speed communication mode such as W-CDMA (Wide Band Code Division Multiple Access), an access to linear flash memory 11 (reading of the instruction code) takes a long time, and the high-speed processing is precluded.

In addition, when the linear flash memory is constituted of an NOR type flash memory, a contact to bit line BL must be provided for every two memory cells MCs and the degree of integration is limited. Thus, when the storage capacity is increased for storage of large amount of data required for the high-speed communication service, the chip area becomes relatively large, the cost increases and development of a smaller portable telephone is impeded.

SUMMARY OF THE INVENTION

An object of the present invention is to provide a memory system for a portable telephone allowing storage of large amount of an audio signal/data without increasing the cost and occupying area.

Another object of the present invention is to provide a memory system for a portable telephone allowing a high-speed data transfer.

In brief, the present invention utilizes a file storage flash memory in place of a linear flash memory.

A memory system for a portable telephone in accordance with the present invention includes a random access memory providing a working area for a control portion for controlling a transmission operation of a signal transmission/reception portion, and a file storage flash memory for storing a program code for the control portion and at least transmission/reception data under the control of the control portion in a non-volatile manner.

The file storage flash memory is constituted of an NAND type flash memory or an AND type flash memory and can be accessed at a faster speed than the linear flash memory, and the area occupied by the memory cell is small. Therefore, a memory with a large storage capacity can be achieved without increase in occupying area.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 represents a schematic structure of a portable telephone according to a third embodiment of the present invention;

DESCRIPTION OF THE PREFERRED EMBODIMENTS

First Embodiment

Figure 1:
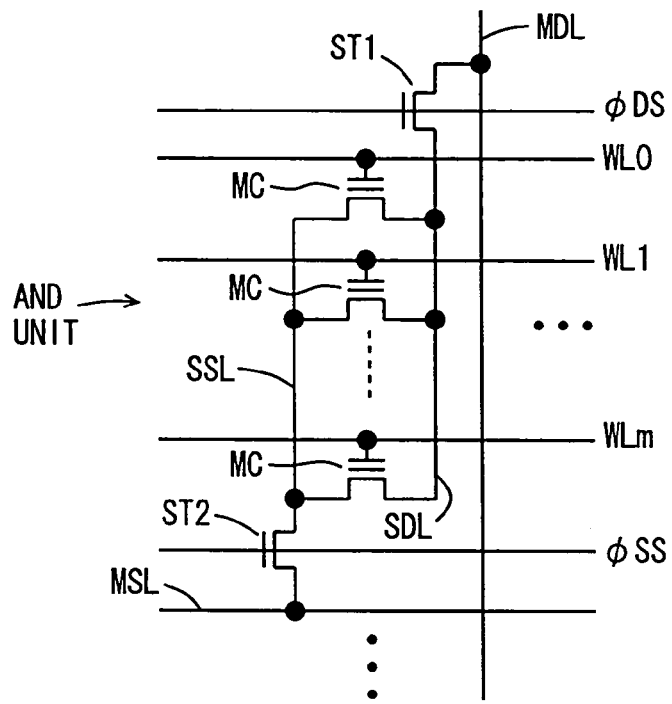
FIG. 1 represents a schematic structure of a memory cell of a file storage flash memory.

FIG. 1 represents a schematic structure of an array portion of an AND type flash memory which is a file storage flash memory utilized in the present invention. The array portion of the AND type flash memory includes memory cells MCs arranged in a matrix. Memory cell MC is constituted of a double layer gate type MOS transistor having a control gate and a floating gate, similarly to the NOR type flash memory. A word line WL (WL0 . . . WLm) is arranged corresponding to a row of the memory cells. A main data line MDL is arranged corresponding to a column of memory cells MCs. Memory cells MCs aligned on a column is divided into memory units (AND units) each including a predetermined number of memory cells MCs. A sub data line SDL and a sub source line SSL are arranged corresponding to memory cells of one AND unit. These sub data line SDL and sub source line SSL are each formed of a diffusion layer and commonly connects drains and sources of memory cells MCs of a corresponding AND unit, respectively. Sub data line SDL is connected to main data line MDL via a drain side select transistor ST1 and sub source line SSL is connected to main source line MSL via a source side select transistor ST2.

Drain side select transistor ST1 and source side select transistor ST2 are rendered conductive in response to a select signal φDS and a select signal φSS, respectively.

In the erasing operation of the AND type flash memory shown in FIG. 1, an erasure voltage is applied to word line WL and the source and the drain of memory cell MC is set to an electrically floating state. A substrate region is set to a ground voltage level. In this state, FN (Fowler-Nordheim) tunneling current flows to the substrate region (well) from the floating gate and the threshold voltage of the memory cell transistor rises.

On the other hand, in the programming operation, sub source line SSL is set to an electrically floating state, a programming voltage of a predetermined level is applied to sub data line SDL and a programming voltage of another level is applied to the control gate (word line). In this state, FN tunneling current flows to the floating gate from the drain, electrons of the floating gate are ejected and the threshold voltage of the memory cell transistor falls.

Figure 16:
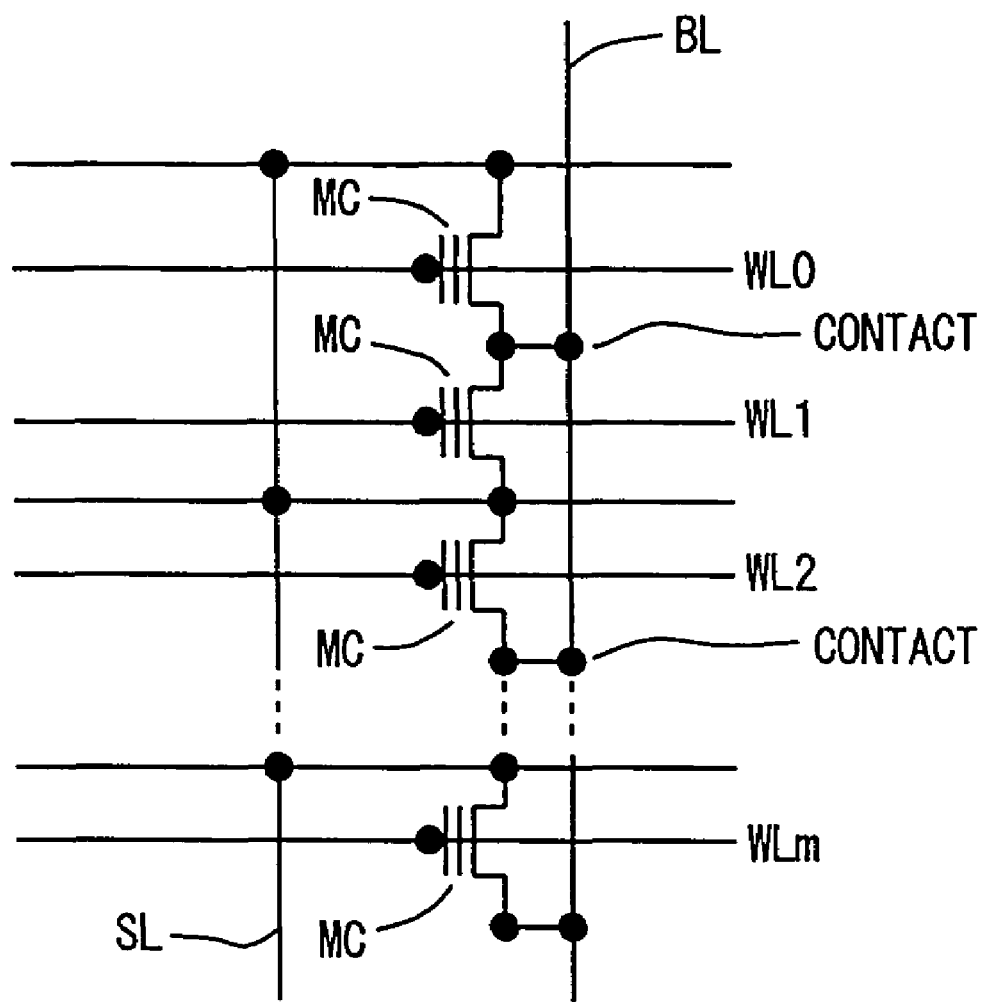
FIG. 16 represents a schematic structure of a memory cell of a linear flash memory shown in FIG. 15.

In the AND type flash memory, memory cells MCs are connected in parallel between sub data line SDL and sub source line SSL and this structure is parallel connection structure similar to the NOR type flash memory shown in FIG. 16. In the AND type flash memory, however, sub data line SDL and sub source line SSL are each formed of a diffusion layer as described above and there is no contact between sub data line SDL and sub source line SSL, and memory cell MC. A "pseudo contactless structure" is adopted. A contact for connecting drain side select transistor ST1 to main data line MDL is required. Therefore, an area of contact region can significantly be reduced as compared with the NOR type flash memory, and higher integration can be achieved.

In addition, the data line and the source line are both arranged hierarchically in the AND type flash memory. Sub data line SDL and sub source line SSL are connected to main data line MDL and main source line MSL via drain side select transistor ST1 and source side select transistor ST2, respectively. Therefore, one-to-one correspondence can be established perfectly between a selected memory cell unit (AND unit) and a data line. For example, the programming and the erasing can be performed on a word line basis, the unit of programming and the unit of erasing can be made matched with each other perfectly (no effect of disturbance will be caused), and the programming and the erasing can be achieved on a basis of a small size block (512 byte to 2 K byte).

In addition, in the AND type flash memory, memory cells MCs are connected in parallel. In data reading, a current flows through only one memory cell MC in main data line MDL, this read current can be made sufficiently large, and a high-speed random reading can be achieved.

Further in the AND type flash memory, a multi-value cell technique in which the threshold voltage of memory cell MC is set to one of a plurality of levels and two-bit information is stored in each cell, is realized prior to its realization in other types of flash memories. Thus, storage capacity can be increased to about 4 to 8 times that of linear flash memory, for example, without the increase in the chip area.

Figure 2:
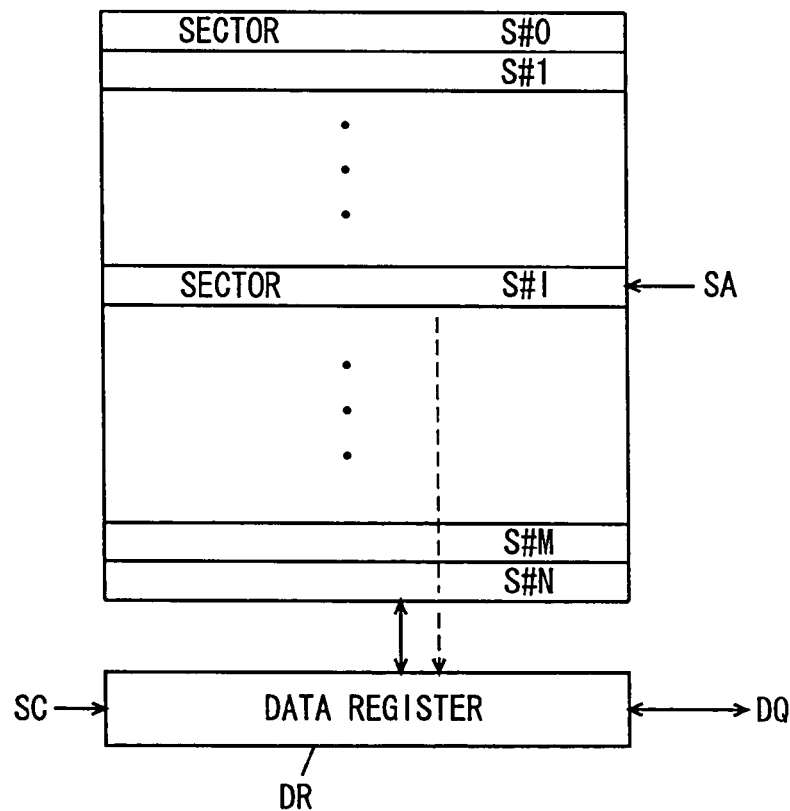
FIG. 2 represents a schematic structure of a file storage flash memory.

FIG. 2 represents a schematic structure of the file storage flash memory. In FIG. 2, the memory array is divided into a plurality of sectors S#0–S#N. A data register DR is commonly provided to these sectors S#0–S#N. Data register DR is capable of storing data for one sector S#. Data register DR performs data input/output according to a clock signal SC. Data in a sector S# (sector S#I in FIG. 2) selected according to a sector address SA is transmitted to data register DR. In data register DR, data is serially read from a location designated by a column address signal CA not shown according to clock signal SC. Thus, though the reading of leading data takes a certain time, thereafter a fast reading can be achieved because data is read according to clock signal SC. The file storage flash memory shown in FIGS. 1 and 2 is utilized in the present invention.

Figure 3:
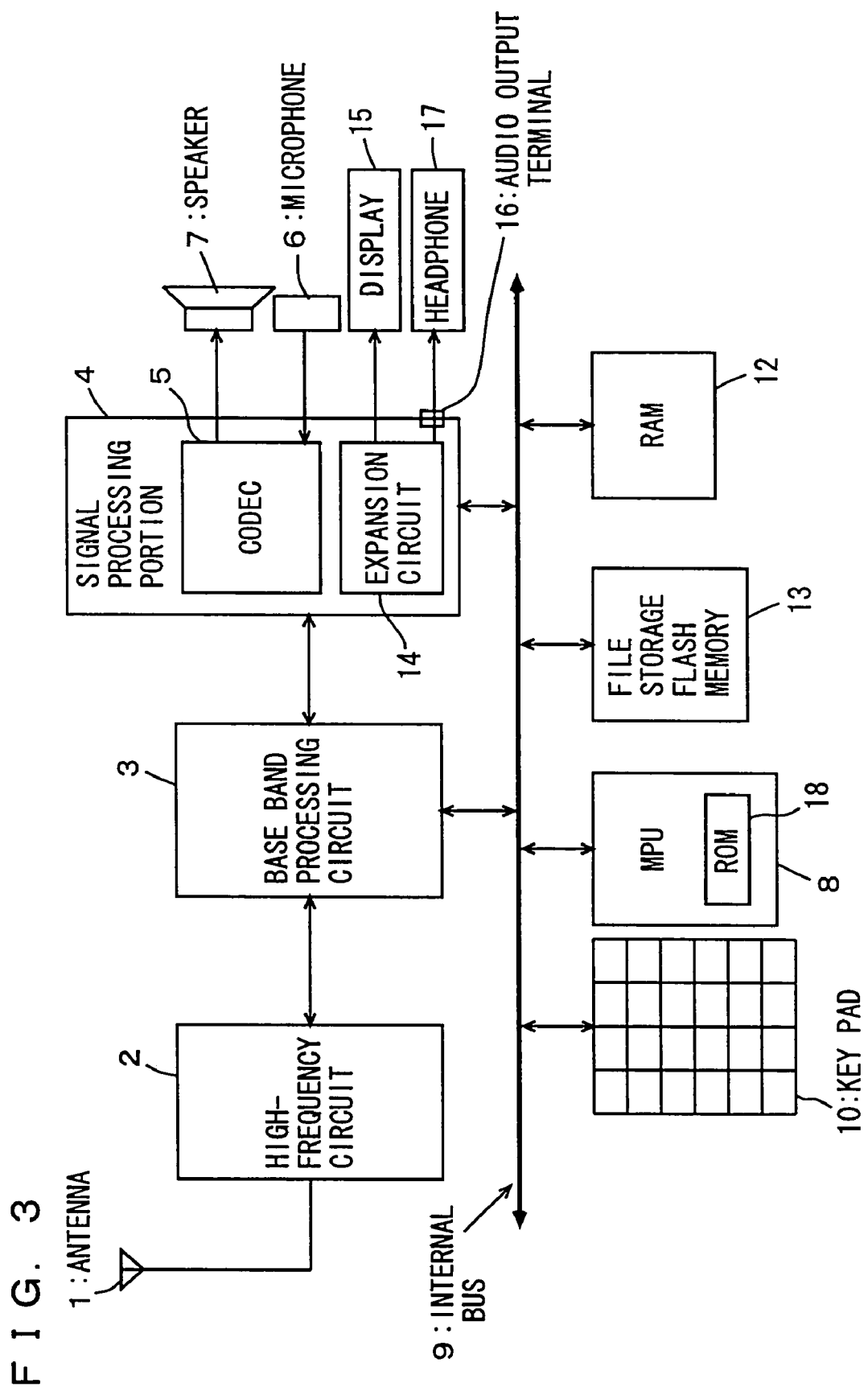
FIG. 3 represents a schematic structure of a portable telephone according to a first embodiment of the present invention.

FIG. 3 represents a schematic structure of a portable telephone in accordance with the first embodiment of the present invention. In FIG. 3, the portable telephone according to the first embodiment of the present invention includes a high-frequency circuit 2 for performing transmission/reception of a data signal and an audio signal via an antenna 1, a base band processing circuit 3 coupled to high-frequency circuit 2 and performing a process such as modulation at a basic frequency, a signal processing portion 4 performing a necessary process such as an encoding/decoding of the audio signal and an expansion process of a received data signal, a speaker 7 outputting a reproduced audio signal received from signal processing portion 4, and a microphone 6 receiving and supplying the audio signal to signal processing portion 4.

In the portable telephone according to the present invention, an audio data signal and an image data signal provided by a provider are received for the use of the portable telephone as a portable information terminal equipment. Signal processing portion 4 includes an expansion circuit 14 for expanding and reproducing the information from an Internet as well as an encoding/decoding circuit (CODEC) 5 for performing an encoding/decoding of an audio signal input and output via normal microphone 6 and speaker 7. Expansion circuit 14 is coupled to a display 15 and an audio output terminal 16. A headphone 17 is connected to audio output terminal 16. Thus, character/image data is displayed on display 15 and audio data such as music is output via audio output terminal 16.

The portable telephone according to the present invention further includes a key pad 10 for an input of operation information or the like, a control portion (MPU) 8 performing a necessary process according to the information supplied through key pad 10, a random access memory (RAM) 12 used as a working area at the time of various processing by control portion 8, and a file storage flash memory 13 storing Internet information such as image and music data as well as program information for controlling the operation of control portion 8. Key pad 10, control portion 8, random access memory 12, file storage flash memory 13, base band processing circuit 3 and signal processing portion 4 are coupled to an internal bus 9.

Control portion 8 includes a mask ROM (read-only memory) 18 therein and this ROM 18 stores a power on reset processing program for controlling an operation at a time of power on.

Figure 4:
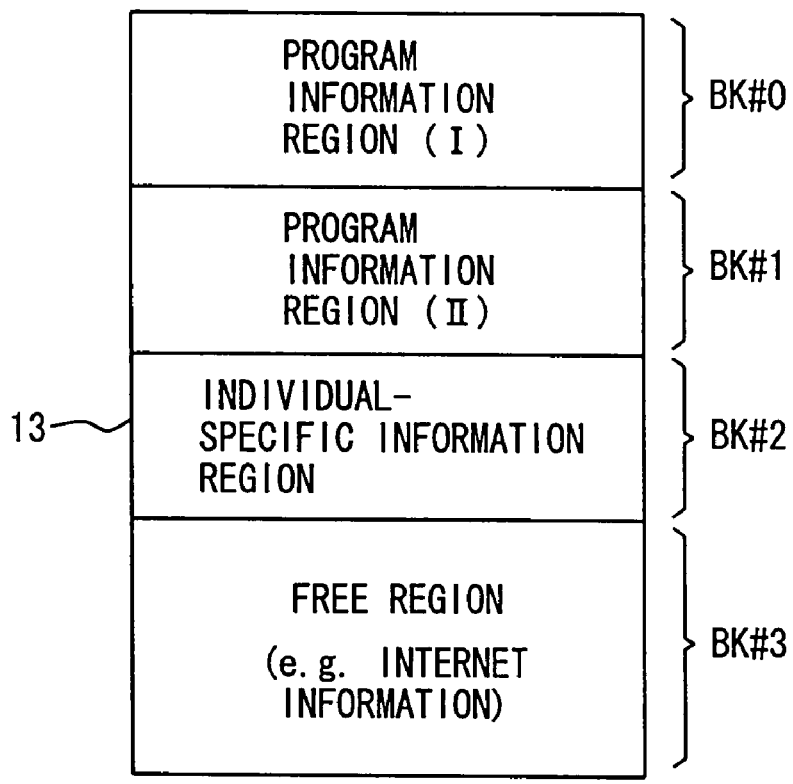
FIG. 4 represents a schematic structure of a storage region of a file storage flash memory shown in FIG. 3.

FIG. 4 schematically represents a data storage region of file storage flash memory 13. In FIG. 4, file storage flash memory 13 includes a storage region BK#0 for storing program information specific to control portion 8, a storage region BK#1 for storing program information for implementing an additional function and so on, a storage region BK#2 for storing information specific to an individual user using the portable telephone, and a free storage region BK#3 for storing data such as a large amount of data from the Internet. A minimum required program such as an OS (operating system) is stored in storage region BK#0.

Program information stored in storage region BK#1 includes an application program formed by a manufacturer of the portable telephone to implement an additional function of the portable telephone. Personal information stored in storage region BK#2 includes telephone numbers (telephone directory) registered by an individual user, accounting and connecting information and so on. Storage region BK#3 has a relatively large storage capacity and stores image data and audio data sent from a provider of the Internet, for example.

Though file storage flash memory 13 can be accessed in a random manner at a fast speed, it is substantially a serial access memory. As RAM 12 constituted of an SRAM (static random access memory), for example, is employed as a working area at the time of execution of an instruction and arithmetic processing during the processing in this portable telephone, even with file storage flash memory 13 the serial access thereto will not exert a significant effect on the processing. Now, the operation of the portable telephone will be described briefly.

When the portable telephone shown in FIG. 3 is powered on through the manipulation of a power key included in key pad 10, control portion 8 executes the power on reset process routine stored in mask ROM 18. In the power on reset process, a self-diagnostic process of each functional block (such as the base band processing circuit and signal processing portion 3) connected to internal bus 9 and a transfer process of a software code (a program stored in storage region BK#0 or BK#1 shown in FIG. 4) for the control of the operation of control portion 8 stored in file storage flash memory 13 to random access memory (RAM) 12 are performed.

After the transfer process of the software code from file storage flash memory 13 to random access memory 12 is completed by the power on reset process, control portion 8 performs a process using random access memory 12 as an instruction memory. Requested various processes are performed through sequential reading of the software code from random access memory 12 according to an operation designation inputted through key pad 10 or a frame reception data from a base station.

Random access memory 12 is an SRAM, for example, and has an access time a few times faster than that of the linear flash memory, thus allowing improvement in processing speed of control portion 8 compared with the conventional case where reading and execution of the software codes is performed with the linear flash memory used as the instruction memory. In addition, file storage flash memory 13 is a serial access memory, allowing a serial reading of data (software codes) according to a clock signal and high-speed data transfer from file storage flash memory 13 to random access memory (RAM) 12.

As random access memory 12 is utilized as the instruction memory of control portion 8 through the transfer of the software codes to random access memory 12, the serial access operation of file storage flash memory 13 does not affect the random access upon a program execution (because random access memory 12 takes charge of the random access operations).

In a usual conversation, decoding is performed by antenna 1, high-frequency circuit 2, and encoding/decoding circuit (CODEC) 5 included in signal processing portion 4 under the control of control portion (MPU) 8 and a reproduced analog audio signal is generated and output from speaker 7. On the other hand, an audio signal to be transmitted is applied from microphone 6 to encoding/decoding circuit (CODEC) 5 of signal processing portion 4, converted to transmission data (digital signal) through an encoding process according to a predetermined format, subjected to a predetermined modulation process and so on by base band processing circuit 3, amplified by an amplifier included in high-frequency circuit 2 and sent out via antenna 1. When the audio signal is to be stored temporarily and then transmitted after a certain time period, the audio signal is stored in storage file flash memory 13 via signal processing portion 4.

At the data communication through the Internet connection or the like, control portion 8 reads out predetermined application or control codes stored in storage file flash memory 13 and executes a necessary process as required according to information input from key pad 10 and a transmission control signal from the base station. Received data such as an image and a music supplied from a provider of the Internet is once stored in random access memory 12 via signal processing portion 4 if necessary (when an image is to be reproduced later, for example). When data is to be stored in random access memory 12, the received data is stored intactly as compressed data. After being stored in random access memory 12, received data is sequentially stored in file storage flash memory 13. Compressed data (Internet information) of an image, a music or the like stored (downloaded) in file storage flash memory 13 is sent to signal processing portion 4 as required, and expanded by expansion circuit 14, and thus the compressed data is converted to an original reproduced data. The reproduced data from expansion circuit 14 is shown on display 15 when the data is image data (including character data) and reproduced by headphone 17 connected to audio output terminal 16 when the data is audio data.

Data supplied from a provider of the Internet is time series data for both image data and audio data. Through the temporarily storage of received data in random access memory (RAM) 12, data can be stored in random access memory (RAM) 12 according to a speed of data transfer from the Internet. In other words, random access memory 12 is utilized as a buffer memory for adjusting the operating speed of file storage flash memory 13 and the transfer speed of the data from the Internet. Data is stored serially from random access memory 12 to file storage flash memory 13 according to the received data (a transmission control signal from the base station). Data can be written to file storage flash memory 13 at fast speed through serial accessing. Random access memory 12 is used merely as a buffer memory, and is not required of a large storage capacity.

Thus in the first embodiment, file storage flash memory 13 with a large storage capacity and low cost per bit is connected to control portion 8. The software codes for controlling control portion 8 are stored in file storage flash memory 13. On the power on reset process at power-on, the software codes for the control of control portion 8 is transferred from file storage flash memory 13 to fast accessible random access memory 12. Thereafter, control portion 8 executes a necessary process while reading the software codes for the control from random access memory 12. On the other hand, when a large amount of data is received in the Internet connection or the like, random access memory 12 is utilized as a buffer memory and received data is stored in file storage flash memory 13, if necessary. Thus, control portion 8 can achieve fast processing by processing through access to fast random access memory 12, and, the portable telephone set usable as an Internet terminal capable of receiving a large amount of received data such as an image and a music can be achieved at a relatively low cost.

Second Embodiment

Figure 5:
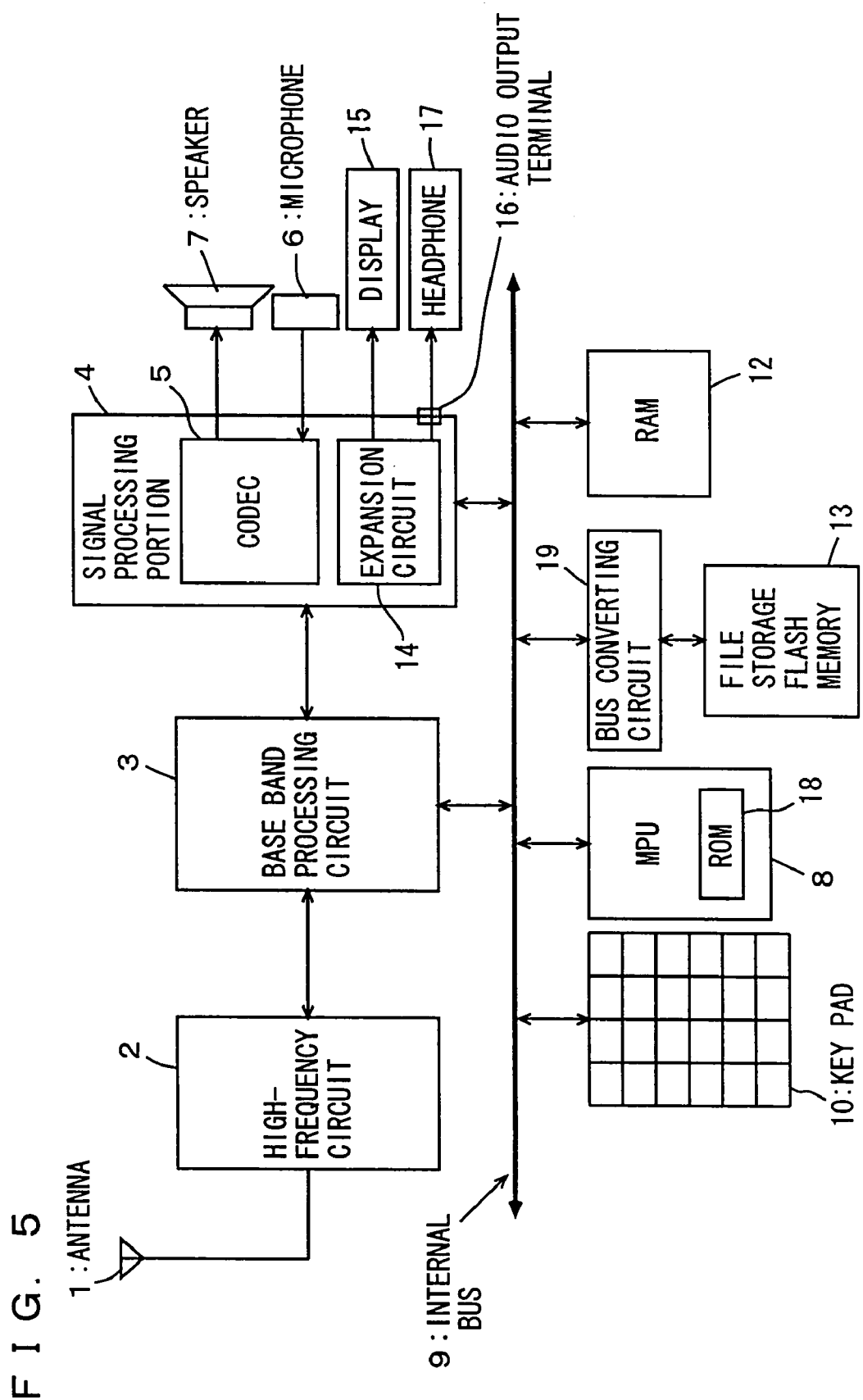
FIG. 5 represents a schematic structure of a portable telephone according to a second embodiment of the present invention.

FIG. 5 represents a schematic structure of a portable telephone according to the second embodiment of the present invention. In the portable telephone shown in FIG. 5, file storage flash memory 13 is coupled to internal bus 9 via a bus converting circuit 19. As for other points, the structure is the same as the structure shown in FIG. 3 and the corresponding portion are denoted by the same reference numerals and detailed description thereof will not be repeated.

Bus converting circuit 19 converts an address bus and a control bus on internal bus 9 to a bus format suitable for file storage flash memory 13.

Figure 6A:
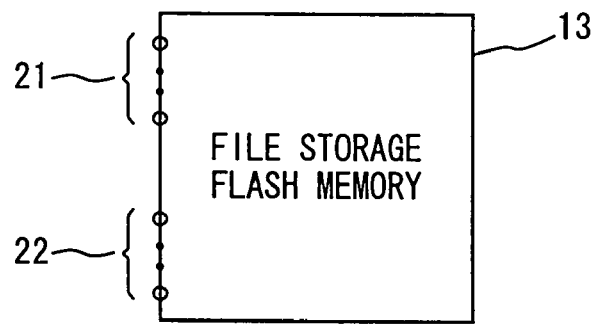
FIG. 6A represents a schematic pin arrangement of a file storage flash memory and FIG. 6B represents a sequence of signal application to a terminal group 22 shown in FIG. 6A.
Figure 6B:
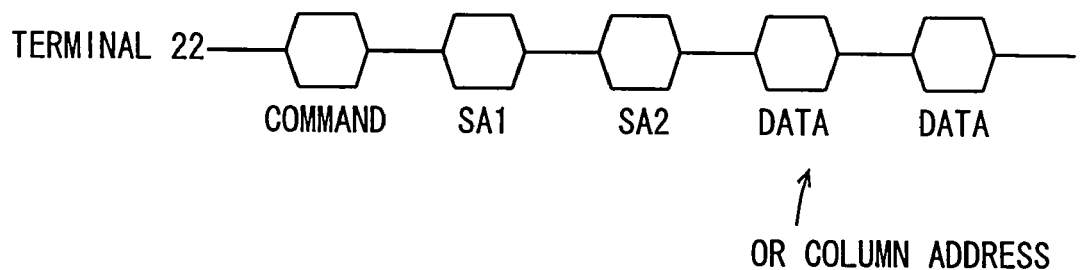

FIG. 6A represents a schematic arrangement of external terminals of the file storage flash memory. In FIG. 6A, the file storage flash memory includes a group 21 of control signal terminals receiving control signals and a group 22 of data/address signal terminals receiving data and address signal. Signals such as Chip Enable signal, Output Enable signal and Write Enable signal and Command Enable signal are supplied to control signal terminal group 21. An operating mode is designated in a form of a command for file storage flash memory 13. As shown in FIG. 6B, an operating mode is designated by the command applied to terminal group 22. Then, sector addresses SA1 and SA2 to terminal group 22 designate a sector to be accessed. Then, write data is supplied to terminal group 22 at the time of data writing and read data is output from terminal group 22 at the time of data reading. Here, a column address designating a leading column address for the serial access may be applied to terminal group 22.

Figure 7:
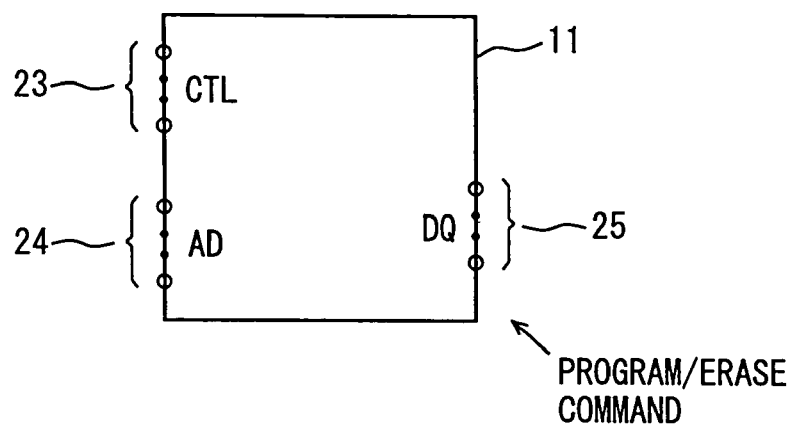
FIG. 7 represents a schematic pin arrangement of a linear flash memory.

The command, the sector address, the column address and data are supplied to terminal group 22 in a time-division, multiplexed manner as described above. On the other hand, the linear flash memory includes a group 23 of control signal terminals receiving a control signal CATL, a group 24 of address signal terminals receiving an address signal AD and a group of 25 input/output data terminals inputting/outputting write/read data DQ as represented by a schematic pin arrangement shown in FIG. 7. Control signal CATL generically represents a plurality of control signals. Address signal AD and input/output data DQ are applied via separate terminal groups, respectively. Programming/erasing operation are performed through the application of a programming command or an erase command to group 25 of data input/output terminals. In the linear flash memory, the address signal and the write data are supplied in parallel after the command issuance at the time of data writing. At the data reading, an address signal is applied, a control signal is set to a reading mode state, and then data is output according to the address signal.

Thus, linear flash memory 11 and file storage flash memory 13 have different pin arrangements and correspondingly different bus arrangements, and a command is supplied in different manners. Hence, bus conversion circuit 19 connects the bus and converts the command.

Figure 8:
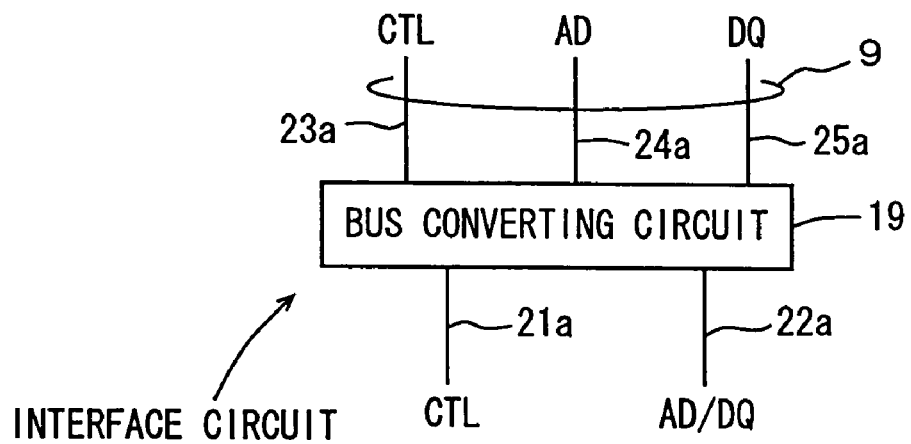
FIG. 8 schematically represents a function of a bus converting circuit shown in FIG. 4.

As shown in FIG. 8, bus converting circuit 18 converts control bus 23a, and address bus 24a and data bus 25a included in internal bus 9 to control signal bus 21a and data/address bus 22a, respectively. Address signal AD and data DQ transmitted via separate buses 24a and 25a in internal bus 9 are coupled to address/data bus 22a in a time division, multiplexed manner and made compliant with the pin arrangement of file storage flash memory 13. Control signal CATL on control bus 23a is transmitted onto control bus 21a.

With the utilization of bus converting circuit 18, control portion 8 can make access through the similar control to those performed for the linear flash memory and random access memory 12 generally having a separated arrangement of the address bus and the data input/output bus. Bus converting circuit 18 performs a bus converting function and transmission/reception of signal data in a time division, multiplexed manner. Through the utilization of bus converting circuit 18, control portion 8 can make access to file storage flash memory 13 without considering the difference in pin arrangement and particularity based on the serial access of file storage flash memory 13. In other words, file storage flash memory 13 can be controlled as a storage device with an ATA (AT attachment (IDE (Integrated Device Electronics))) Interface which is a standard interface specification for an HDD (hard disc drive), for example.

In this case, widely used PCMCIA-ATA specification established by PCMCIA (Personal Computer Memory Card International Association) as an interface for the bus converting circuit may be utilized, and an access to the flash memory may be performed through the use of an MTD (memory technology driver) which is a software module constituted of rewriting algorithm codes specific to various flash EEPROM (flash memory). In addition, bus converting circuit 19 may have a command converting function. The difference in operation of control portion 8 between the case where the linear flash memory is utilized and the case where the file storage flash memory is utilized, is minimized to minimize the change in specification (program) of control portion 8 (change in program) as far as possible.

Thus, according to the second embodiment of the present invention, as the bus converting circuit for changing the connection of the bus is provided between the file storage flash memory and the internal bus, the control portion can access the file storage flash memory regardless of the inherent characteristics of the file storage flash memory, and the file storage flash memory can be accessed without significant change in a flash memory management software.

Third Embodiment

FIG. 9 represents a schematic structure of a portable telephone according to the third embodiment of the present invention. In the portable telephone shown in FIG. 9, bus converting circuit 19 and file storage flash memory 13 are integrated into a memory card 30. In other points, the structure is the same as the structure shown in FIG. 5 and the corresponding portion are denoted by the same reference numerals and the detailed description thereof will not be repeated.

Figure 10:
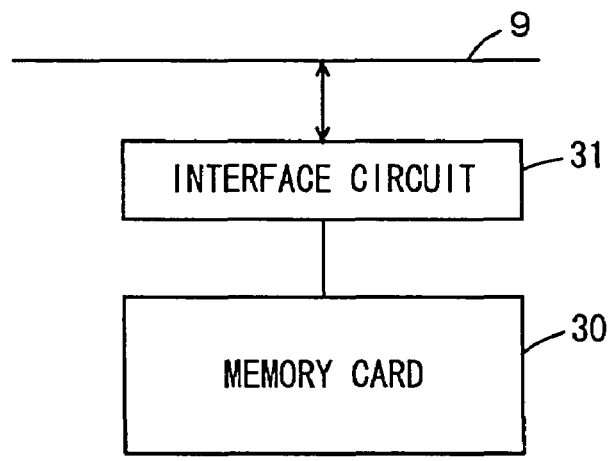
FIG. 10 represents a schematic structure for connection of a card according to the third embodiment.

Memory card 30 can be attached/detached to/from the portable telephone and is coupled to internal bus 9 via a connector (not shown) of the portable telephone. As shown in FIG. 10, an interface circuit 31 between memory card 30 and the portable telephone (internal bus 9) complies with a PC card standard, a small size compact flash specification, or other specification for smaller cards. In addition, data in the file storage flash memory included in memory card 30 are stored in a file format generally used in a personal computer or the like.

Figure 11:
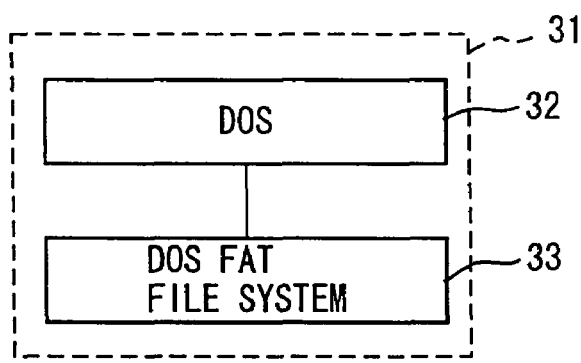
FIG. 11 represents a schematic structure of a management software stored in an interface circuit shown in FIG. 10.

FIG. 11 represents a schematic structure of a flash memory management software of control portion 8. The flash memory management software for controlling interface circuit 31 includes a disk operating system (DOS) for controlling the data input/output and a DOSFAT file system 33 storing address allocation of files of a disk in a table form.

DOSFAT file system 33 manages an address of a file of a disk device such as a hard disk. The data stored in the file storage flash memory of memory card 30 is arranged into a file through the utilization of DOSFAT file system 33.

Figure 12:
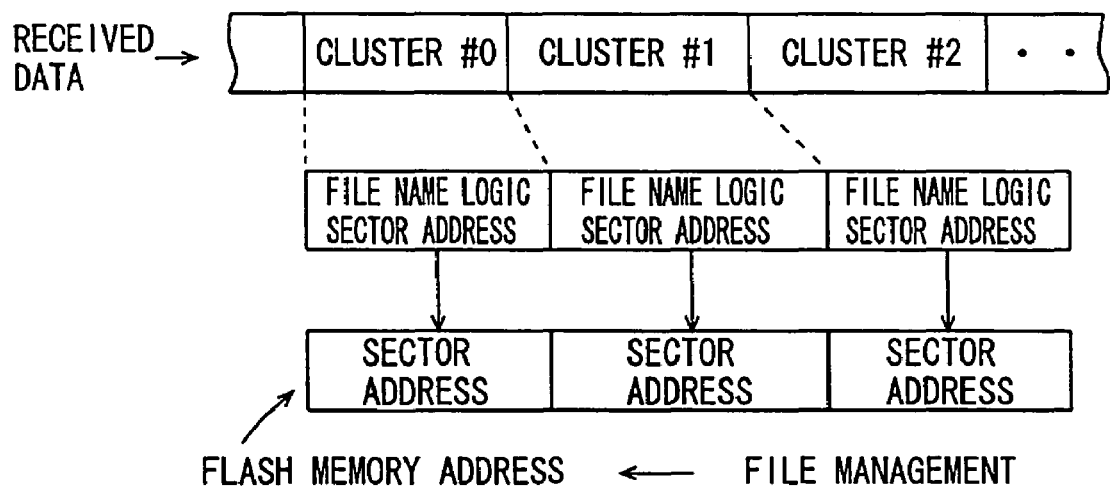
FIG. 12 represents a schematic structure of a data file management of a management software shown in FIG. 11.

Received data is transferred in the form of clusters #0, #1, #2, . . . (or in the form of packets) at the time of Internet connection as shown in FIG. 12. A file name and a logic sector address are allocated to each of clusters #0, #1, #2, . . . . These file name and logic sector address are correlated to a sector address (and column address) of the file storage flash memory. In file storage flash memory 13, data is stored in a unit of a cluster correlated to a sector, and the address region is managed in a cluster unit by DOSFAT file system 33 while the correspondence between the cluster and the sector address is maintained.

DOSFAT file system 33 is an interface specification for an external storage device utilized in a general personal computer. With a specification of an interface to memory card 30 being the file format specification, the storage data of the file storage flash memory is managed, and therefore image data and audio data supplied from a provider of the Internet and received by the portable telephone can be communicated with an equipment such as personal computer. More specifically, after image data or audio data stored by the portable telephone is taken in and processed by a personal computer, and image data and audio data downloaded or produced by the personal computer is stored in memory card 30, and then image data or audio data can be reproduced and transferred by the portable telephone through the connection of memory card 30 to the portable telephone set.

Though DOSFAT file system 33 is utilized in the embodiment described above, a flash file system (FFS) for a flash memory can be employed as well, and the flash file system may be employed in combination with the MTD described above.

Further, the software for the flash management may not be prepared in interface circuit 31, but may be stored in random access memory 12 through reading out from flash memory 13 according to a routine from ROM 18 when the card is connected.

Modification

Figure 13:
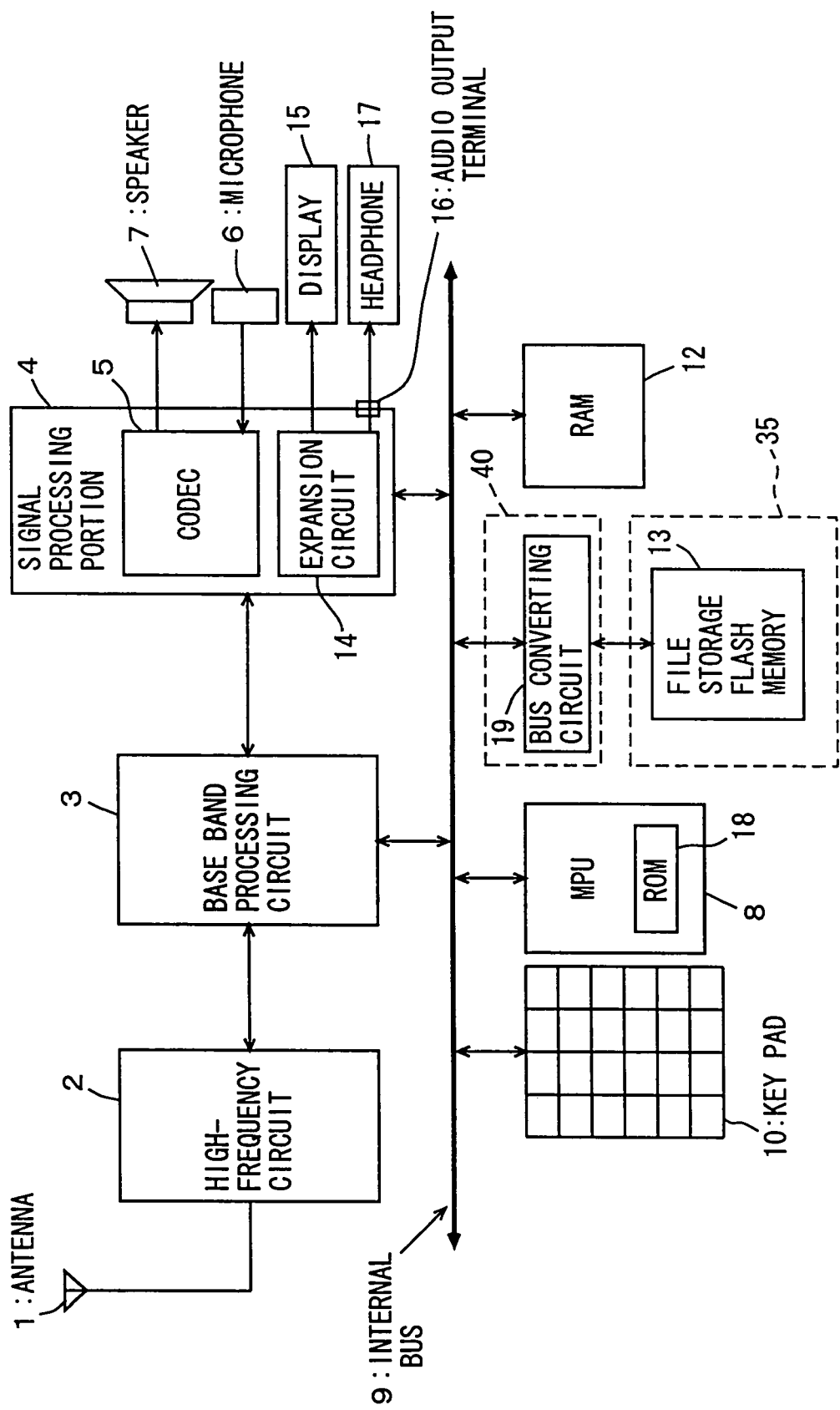
FIG. 13 represents a schematic structure of a portable telephone according to a modification of the third embodiment of the present invention.

FIG. 13 represents a structure of a modification of the third embodiment of the present invention. In the structure shown in FIG. 13, a memory card 35 includes file storage flash memory 13 alone. Memory card 35 is coupled to internal bus 9 via an adapter 40 including bus converting circuit 19. In this case, memory card 35 can be attached/detached to/from adapter 40, and adapter 40 may be incorporated in a main body of the portable telephone, or may be made attachable/detachable to/from the portable telephone. The specification of an interface is the same as the one described above.

In the structure shown in FIG. 13, it is not necessary to adapt memory card 35 both to a slot of the personal computer and to a slot of the portable telephone. The connection of pin terminals and so on of memory card 35 is adjusted by adapter 40 and the compatibility with the personal computer or other equipment will be maintained. When memory card 35 complying with the standard of the personal computer is utilized, the portable telephone can be utilized as a portable information terminal equipment for the Internet or the like.

Thus, according to the third embodiment of the present invention, the file storage flash memory is formed as a memory card attachable/detachable to/from the portable telephone, the interface specification is made to comply with the standard specification, and data formatted as a file is stored. Hence, the transmission of data with the personal computer becomes simplified and a portable information terminal equipment allowing broader application can be achieved.

Fourth Embodiment

Figure 14:
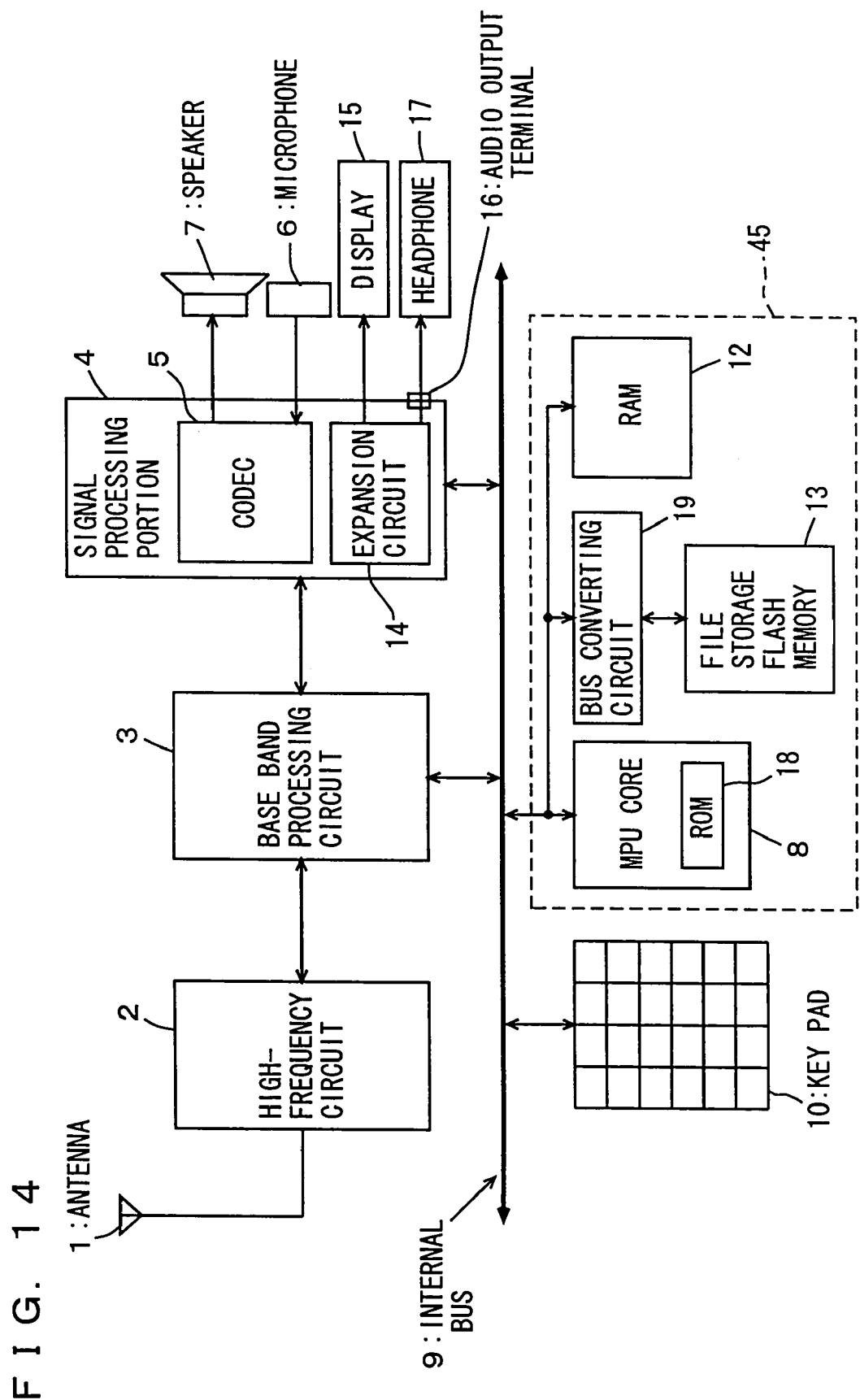
FIG. 14 represents a schematic structure of a portable telephone according to a fourth embodiment of the present invention.
Figure 15:
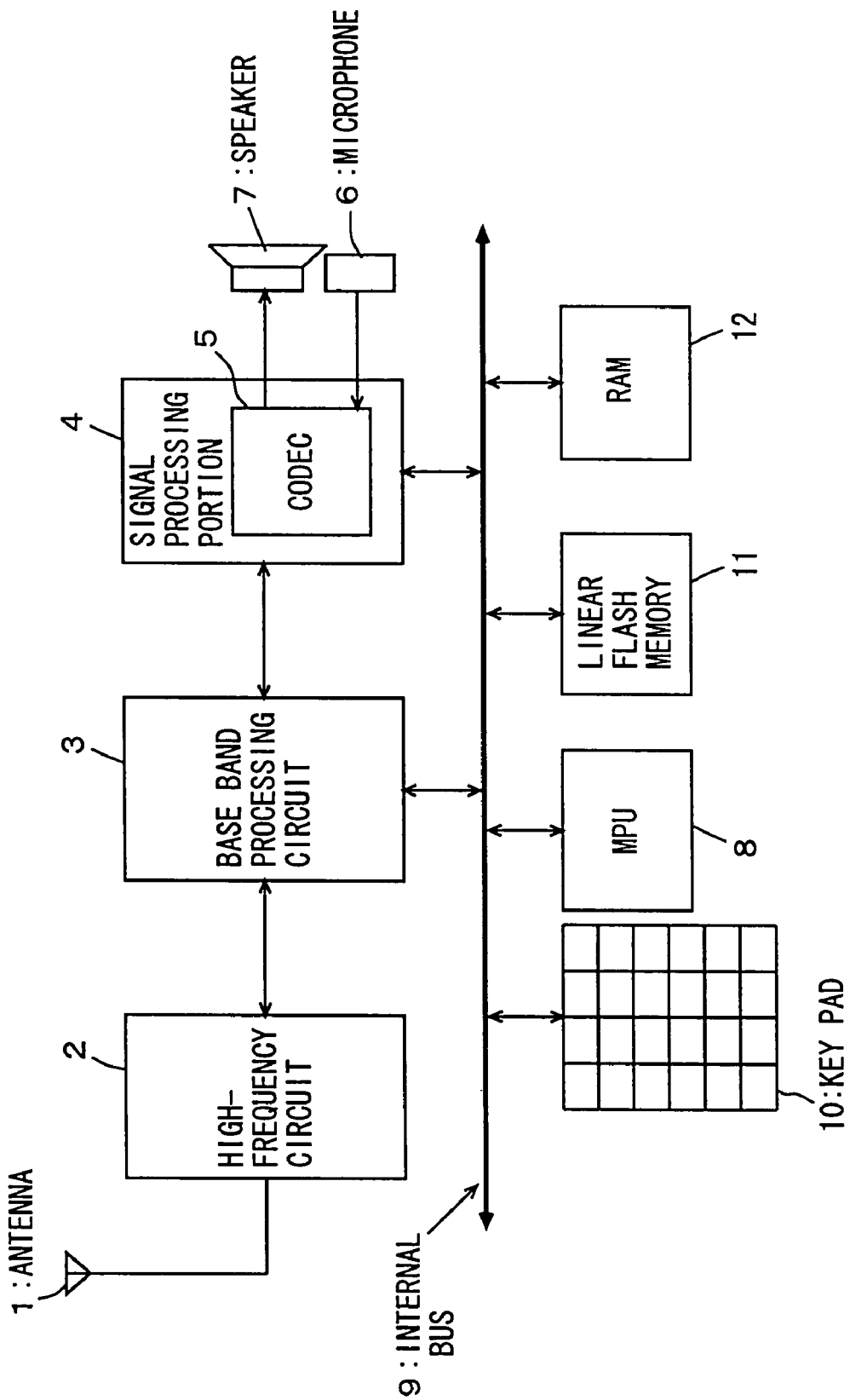
FIG. 15 represents a schematic structure of a conventional portable telephone.

FIG. 14 represents a schematic structure of a portable telephone according to the fourth embodiment of the present invention. In the structure shown in FIG. 14, a control unit 45 integrally includes MPU core (control portion) 8, bus converting circuit 19, random access memory 12, and file storage flash memory 13. MPU core 8 includes a read only memory (ROM) 18 storing a routine for performing an initializing operation at power-on.

In the structure shown in FIG. 14, control unit 45 integrally includes MPU core 8, random access memory 12 and file storage flash memory 13, and bus converting circuit 19 and random access memory (RAM) 12 are coupled to an internal bus of MPU core 8. In this case, control unit 45 is coupled to internal bus 9 via an interface circuit not shown. Therefore, an area occupied by control unit 45 can be reduced and a small size portable telephone can be obtained.

In the structure shown in FIG. 14, as control unit 45 includes file storage flash memory 13 and random access memory (RAM) 12, a function such as memory capacity or the like may become insufficient. In this case, the lacked function (a memory for example) can be provided through the connection to internal bus 9 as shown in first to third embodiments, and the lacking in function can be supplemented.

Thus, according to the fourth embodiment of the present invention, as components of the control portion, that is, MPU core, file storage flash memory 13, bus converting circuit 19 and random access memory 12 are integratedly formed, the occupying area can be reduced (due to a one-chip microprocessor implementation), and small size, and light weight portable telephone can be provided.

Other Application

From first to fourth embodiments, the random access memory (RAM) working as the instruction memory of the control portion is described as a static random access memory. Random access memory 12, however, can be formed with a dynamic random access memory (DRAM) capable of fast-speed operation in synchronization with a clock signal, for example, and the same effect can be obtained.

Thus, according to the present invention, as the file storage flash memory for storing the program for the control portion and received data in a non-volatile manner is utilized as a memory for the portable telephone, a large amount of data such as audio data and image or video data can be stored.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A memory system for a portable telephone including a signal transmission/reception portion for transmitting and receiving a signal and a control portion for controlling at least a signal transmission and reception operation of said transmission/reception portion, comprising:

a random access memory providing a working area for said control portion; and a flash memory including a memory array storing a program for said control portion and at least transmission and reception data in a non-volatile manner under a control of said control portion, said memory array being divided into a plurality of storage units, and a register, provided commonly to the respective storage units, having information in a storage unit of said plurality of storage units transmitted thereinto for temporal storage of the transmitted information and allowing serial readout of the transmitted and stored information.

2. The memory system for the portable telephone according to claim 1, wherein said random access memory and said flash memory are coupled to an internal bus interconnecting said control portion and said signal transmission/reception portion.

3. The memory system for the portable telephone according to claim 2, further comprising a bus converting circuit connected between said flash memory and said internal bus and functioning as an interface circuit for said flash memory.

4. The memory system for the portable telephone according to claim 3, wherein said flash memory and said bus converting circuit are integrally formed into a memory card being attachable and detachable to and from said portable telephone.

5. The memory system for the portable telephone according to claim 3, wherein said flash memory is constituted of a memory card being attachable and detachable to and from said bus converting circuit.

6. The memory system for the portable telephone according to claim 1, wherein said control portion, said random access memory and said flash memory are integrally formed as a control unit.

7. The memory system for the portable telephone according claim 1, wherein said flash memory comprises an AND type flash memory.

8. The memory system for the portable telephone according to claim 5, wherein said bus converting circuit is formed into an adapter attachable and detachable to said portable telephone.

9. The memory system for a portable telephone according to claim 1, wherein a program stored in the storage unit of said plurality of storage units is serially read out to the random access memory to be executed.

10. The memory system for a portable telephone according to claim 1,
wherein said control portion performs a process using the random access memory as an instruction memory to which the program is serially transferred from the flash memory.

11. The memory system for a portable telephone according to claim 1,
wherein said control portion stores transmission and reception data into said random access memory as a buffer memory, and transfers the stored transmission and reception data from the random access memory to the flash memory.

12. A memory system for a portable telephone including a signal transmission/reception portion transmitting and receiving a signal, and a control portion controlling at least a signal transmission and reception operation of said signal transmission/reception portion, comprising:
a random access memory providing a working area for said control portion; and
a flash memory including a memory array storing a program for said control portion and at least transmission and reception data in a non-volatile manner under a control of said control portion, said memory array being divided into a plurality of storage units, a plurality of pieces of information in one unit of the storage units selected in accordance with an address signal at a time, being allowed to be serially read out in synchronization with a clock signal without further address application.

13. The memory system for a portable telephone according to claim 12, wherein a program stored in the storage unit of said plurality of storage units is serially read out to the random access memory to be executed.

14. The memory system according to claim 12, wherein said control portion performs a process using the random access memory as an instruction memory to which the program is serially transferred from the flash memory.

15. The memory system according to claim 12, wherein said control portion stores transmission and reception data into said random access memory as a buffer memory, and transfers the stored transmission and reception data from the random access memory to the flash memory.

16. The memory system for a portable telephone according to claim 12, wherein one unit of the storage units comprises a storage capacity ranging from 512 bytes to 2 K bytes.

17. The memory system for a portable telephone according to claim 12, wherein the storage units are each formed of a sector.

18. The memory system for a portable telephone according to claim 1, wherein one unit of the storage units comprises a storage capacity ranging from 512 bytes to 2 K--bytes.

19. The memory system for a portable telephone according to claim 1, wherein the storage units are each formed of a sector.

* * * * *